United States Patent [19]
Esau et al.

[11] Patent Number: 5,735,199
[45] Date of Patent: Apr. 7, 1998

[54] FOUR-SIDE SQUEEZE MECHANISM FOR EXTRUSION-TYPE SQUARE BALER

[75] Inventors: Edward Wesley Esau, Hesston; Cecil Leon Case, Newton, both of Kans.

[73] Assignee: Hay & Forage Industries, Hesston, Kans.

[21] Appl. No.: 726,390

[22] Filed: Oct. 4, 1996

[51] Int. Cl.⁶ ............................... A01F 15/04; B30B 9/30
[52] U.S. Cl. ........................................ 100/191; 56/341
[58] Field of Search ........................ 100/41–43, 147, 100/148, 179, 191, 192; 56/341

[56] References Cited

U.S. PATENT DOCUMENTS

| | | | |
|---|---|---|---|
| 296,267 | 4/1884 | Aylsworth | 100/191 |
| 362,884 | 5/1887 | Ertel | 100/191 |
| 471,012 | 3/1892 | Mattijetz | 100/191 |
| 1,319,596 | 10/1919 | Lowther | 100/191 |
| 1,631,881 | 6/1927 | Murray . | |
| 2,470,278 | 5/1949 | West et al. | 100/191 |
| 2,704,508 | 3/1955 | Hansen . | |
| 2,708,872 | 5/1955 | Lauck | 100/192 |
| 2,910,932 | 11/1959 | Wathen . | |
| 3,170,389 | 2/1965 | Parks | 100/192 |
| 3,294,013 | 12/1966 | Seltzer . | |
| 3,350,999 | 11/1967 | Morse . | |
| 3,820,453 | 6/1974 | Tipton . | |
| 3,895,571 | 7/1975 | Freeman . | |
| 4,037,528 | 7/1977 | White et al. . | |
| 4,168,659 | 9/1979 | Yatcilla et al. . | |
| 4,354,430 | 10/1982 | Horiuchi | 100/192 |
| 4,489,648 | 12/1984 | Naaktgeboren . | |
| 4,549,482 | 10/1985 | Esau . | |
| 4,791,865 | 12/1988 | Naaktgeboren . | |

*Primary Examiner*—Stephen F. Gerrity
*Attorney, Agent, or Firm*—Hovey, Williams, Timmons & Collins

[57] ABSTRACT

A bale chamber 22 includes a pair of elongated top rails 72,74, a pair of elongated bottom rails 80,82, an elongated right siderail 80, an elongated left siderail 90, and a squeeze mechanism 24 positioned proximate the discharge end of the bale chamber 22 for symmetrically adjusting the cross-section size of the discharge opening by simultaneous movement of all the rails. The squeeze mechanism 24 includes a vertical squeeze assembly 92 for adjusting the vertical distance between the top and bottom rails 72,74,80,82 and a horizontal squeeze assembly 94 for adjusting the horizontal distance between the left and right siderails 88,90. Each squeeze assembly 92,94 includes a jaw-type lever assembly 96,116 surrounding its respective rails and a cylinder assembly 98,118 that selectively shifts its lever assembly 96,116 and its respective rails towards and away from one another near the discharge end of the bale chamber 22.

6 Claims, 3 Drawing Sheets

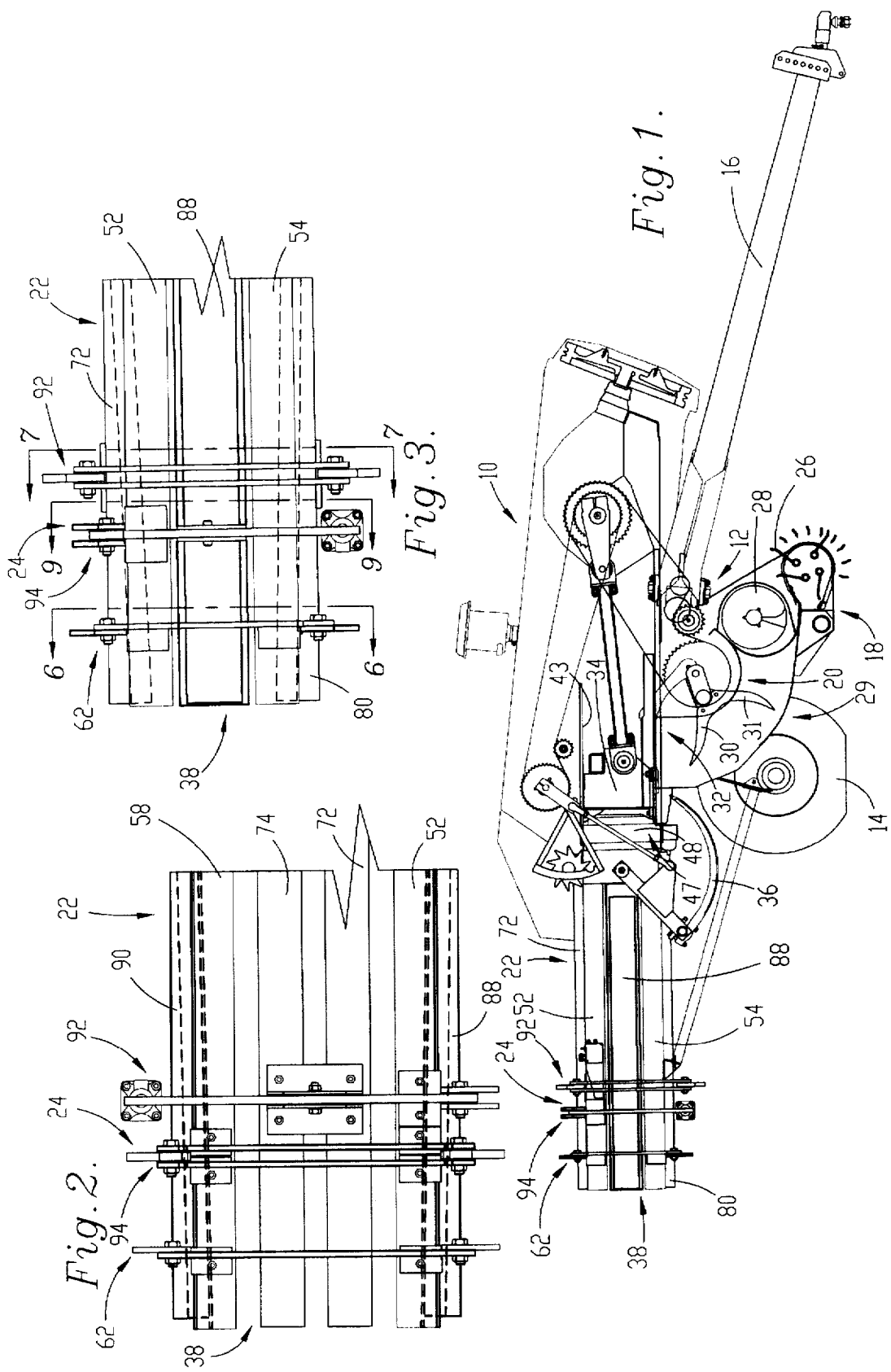

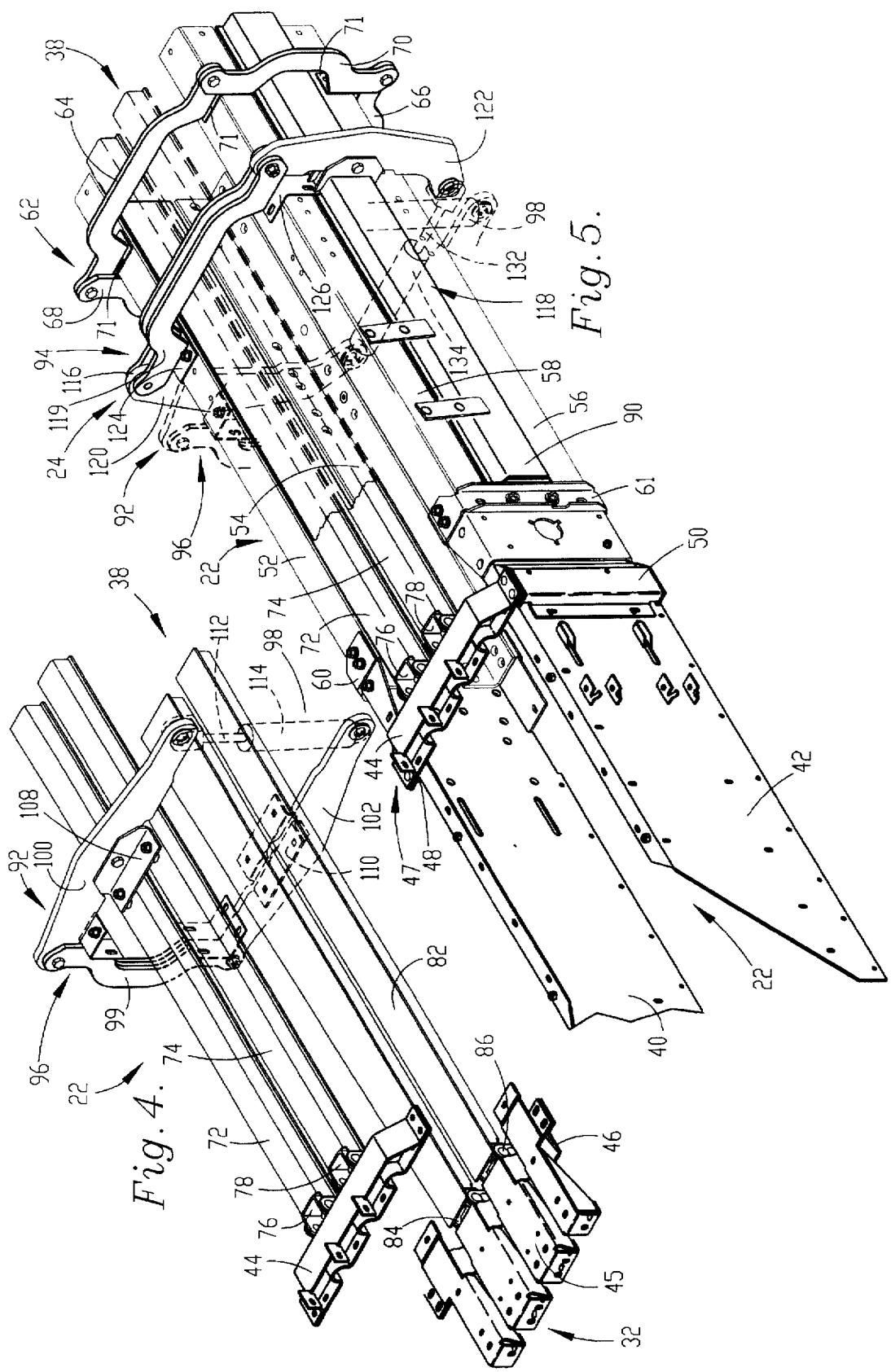

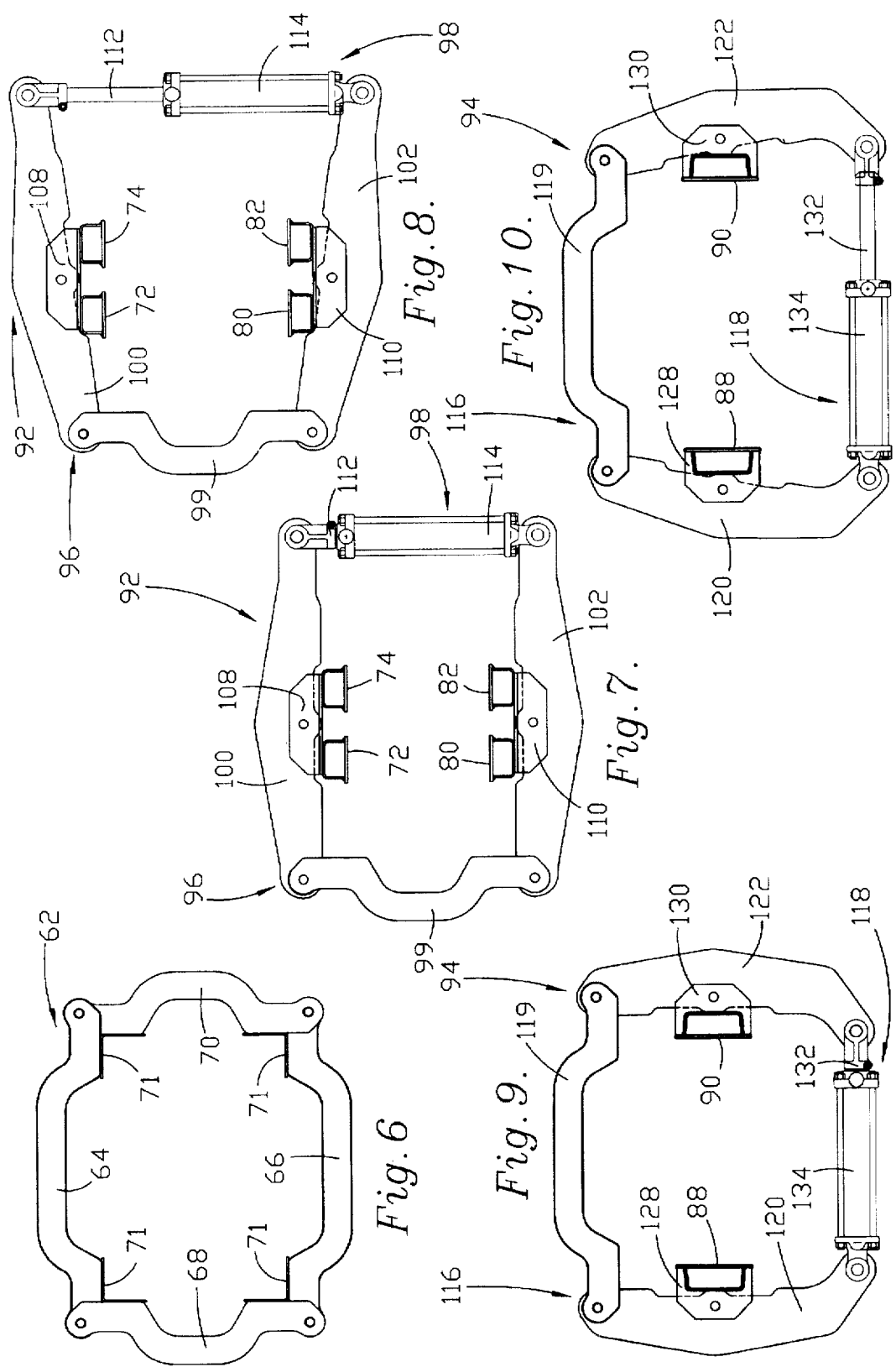

FOUR-SIDE SQUEEZE MECHANISM FOR EXTRUSION-TYPE SQUARE BALER

CROSS-REFERENCE TO RELATED APPLICATIONS

See also the following contemporaneously filed applications for U.S. Ser. No. 08/720,950, entitled BOTTOM LOADING, IN-LINE SQUARE BALER WITH DUAL PURPOSE STUFFER; and Ser. No. 08/726,243, entitled IN-LINE RECTANGULAR BALER SELECTIVELY OPERABLE IN CENTERED OR OFFSET POSITIONS.

BACKGROUND OF THE INVENTION

1. Field of the Invention

The present invention relates to square balers, and more particularly to a squeeze mechanism for adjusting the size of the discharge opening of the bale chamber of a square baler for increasing or decreasing the discharge resistance of the bale chamber.

2. Description of the Prior Art

Squeeze mechanisms on square balers are known in the art. However, prior art squeeze mechanisms suffer from several limitations which limit their utility.

For example, many prior art squeeze mechanisms merely shift the top and bottom walls of the bale chamber toward and away from one another and do not shift the vertical sidewalls. This construction sometimes results in deformed bales because it does not exert uniform pressure on all four sides of the bales.

Squeeze mechanisms that shift all four walls of the bale chamber inward are also known in the art. However, in one known four-wall squeeze mechanism only a single cylinder assembly is used for shifting all the walls. This necessitates the use of complicated toggle linkages and/or crank mechanisms for transferring the mechanical force of the cylinder assembly to all the walls of the bale chamber.

These toggle linkages and crank mechanisms are undesirable for several reasons. For example, those skilled in the art will appreciate that toggle linkages and crank mechanisms may significantly increase the cost and complexity of the square balers. Additionally, since the mechanical force of the cylinder assembly must be transferred through the toggle linkages and the crank mechanisms, some of the force of the cylinder assembly may be lost. Furthermore, the use of such toggle linkages and crank mechanisms often results in dissimilar forces being exerted on the four walls of the bale chamber. As discussed above, unequal pressure exerted by the walls of the bale chamber may result in deformed bales.

OBJECTS AND SUMMARY OF THE INVENTION

In view of the foregoing, it is an object of the present invention to provide a squeeze mechanism for use with a square baler that more effectively adjusts the size of the discharge opening of the bale chamber.

It is a more particular object of the present invention to provide a squeeze mechanism that adjusts all four sides of the bale chamber in a manner that exerts uniform pressure on all sides of bales formed in the bale chamber.

It is another object of the present invention to provide a squeeze mechanism that is capable of carrying out the foregoing objects while being simple and economical to construct.

In view of these objects and other objects that become evident from the description of the preferred embodiments of the invention herein, an improved extrusion-type square baler having a bale chamber for forming bales therein is provided. The bale chamber presents a crop inlet end and a bale discharge end and broadly includes a pair of elongated, vertically spaced top and bottom rails forming the top and bottom walls of the bale chamber and a pair of elongated, horizontally spaced left and right siderails forming the left and right walls of the bale chamber. A squeeze mechanism is positioned proximate the discharge end of the bale chamber for adjusting the distance between the rails for adjusting the size of the discharge opening of the bale chamber.

The squeeze mechanism includes a vertical squeeze assembly for adjusting the vertical distance between the top and bottom rails and a horizontal squeeze assembly for adjusting the horizontal distance between the left and right siderails. Each squeeze assembly includes a cylinder assembly that selectively shifts its corresponding rails toward and away from one another near the discharge end of the bale chamber.

In preferred forms, each squeeze assembly further includes a jaw-type lever assembly including a pair of lever arms that extend across their respective rails. One end of each of the lever arms is pivotally connected to a support arm that is fixedly secured to the bale chamber. The cylinder assembly is coupled between the open ends of the lever arms and is operable for shifting or pivoting the lever arms toward and away from one another about the support arm. Each lever arm is secured to its respective rail so that the rails are shifted toward and away from one another during operation of the cylinder assembly.

By constructing a square baler having a squeeze mechanism as described herein, numerous advantages are realized. For example, by constructing a squeeze mechanism that includes both a vertical and a horizontal squeeze assembly for shifting rails extending along all four sides of the bale chamber, more equal pressure is exerted on all sides of the bales formed in the bale chamber.

Additionally, by constructing a squeeze mechanism with a pair of cylinders that each act directly on a corresponding lever assembly, complex linkages and cranks for transferring the mechanical force of a single cylinder to all of the rails are not needed. Additionally, by eliminating the linkages and cranks, the squeeze mechanism is simple and economical to construct, and reliable in operation.

BRIEF DESCRIPTION OF THE DRAWING FIGURES

A preferred embodiment of the present invention is described in detail below with reference to the attached drawing figures, wherein:

FIG. 1 is a schematic side elevational view of a square baler constructed in accordance with a preferred embodiment of the invention, internal working components of the machine being exposed for purposes of illustration;

FIG. 2 is a partial top view of the bale chamber and squeeze mechanism of the square baler;

FIG. 3 is a partial side view of the bale chamber and squeeze mechanism of the square baler;

FIG. 4 is a left, front isometric view of the top and bottom rails of the bale chamber and the vertical squeeze assembly of the squeeze mechanism in more detail;

FIG. 5 is a left, front isometric view of the left and right siderails of the bale chamber and the horizontal squeeze assembly of the squeeze mechanism in more detail;

FIG. 6 is a vertical cross-sectional view of the bale chamber taken generally along line 6—6 of FIG. 3, illustrating stationary frame members of the bale case;

FIG. 7 is a vertical cross-sectional view of the bale chamber and squeeze mechanism taken generally along line 7—7 of FIG. 3 and illustrating the vertical squeeze assembly in the fully retracted, most restricted position;

FIG. 8 is a vertical cross-sectional view similar to FIG. 7 but illustrating the vertical squeeze assembly in its fully extended, least restrictive position;

FIG. 9 is a vertical cross-sectional view of the bale chamber and squeeze mechanism taken substantially along line 9—9 of FIG. 3 illustrating the horizontal squeeze assembly in its fully retracted, most restricted position; and FIG. 10 is a vertical cross-sectional similar to FIG. 9 but illustrating the horizontal squeeze assembly in its fully extended, least restrictive position.

DETAILED DESCRIPTION OF THE PREFERRED EMBODIMENTS

In the following description, "left" and "right" directions are determined as viewed from the rear of the baler, looking forwardly.

Turning now to FIG. 1, a square baler 10 constructed in accordance with a preferred embodiment of the invention is illustrated. The baler 10 broadly includes a chassis 12 supported above the ground by a pair of ground wheels 14 (only one being shown), a tongue 16 extending from the forward end of the chassis and adapted for connection with a towing vehicle, a pickup 18 and a stuffer assembly 20 for collecting crop from a field, a bale chamber 22 supported on the rear end of the chassis 12 for receiving the crop from the stuffer assembly 20 and for forming bales therein, and a squeeze mechanism 24 positioned proximate the discharge end 38 of the bale chamber 22 for adjusting the size of the discharge opening of the bale chamber 22.

In more detail, the chassis 12 and ground wheels 14 are conventional in construction and are provided for supporting the components of the square baler 10 above the ground. The relationship between the tongue 16 and the rest of the baler is the subject of a co-pending U.S. patent application, Ser. No. 08/726,243, entitled "IN-LINE RECTANGULAR BALER SELECTIVELY OPERABLE IN CENTERED OR OFFSET POSITIONS". In general, the tongue 16 is pivotally connected to the chassis 12 for selective, horizontal swinging adjustment by a hydraulic cylinder (not shown) between offset and centered positions. This permits the towing vehicle to pull the baler 10 from either a position beside a windrow or a position centered on and straddling a windrow.

The pickup 18 is supported below and forward of the chassis 12 and bale chamber 22 for collecting crop from a windrow as the baler 10 is advanced along the windrow. Rake tines 26 of the pickup are moved in a generally elliptical path by conventional mechanism for collecting, lifting, and delivering crop to the stuffer assembly 20. The pickup 18 may also include a pair of down-turning stub augers 28 rotatably mounted at opposite ends of the pickup 18 for moving crop collected by the outermost tines toward the center of the pickup 18.

The stuffer assembly 20 is the subject of a co-pending U.S. patent application, Ser. No. 08/720,950, entitled "BOTTOM LOADING, IN-LINE SQUARE BALER WITH DUAL PURPOSE STUFFER". In general, the stuffer assembly 20 functions to sweep upwardly and rearwardly through a transfer duct 29 in successive stuffing strokes to deliver successive charges of crop material into the bale chamber 22 via an inlet 32 in its bottom wall. Stuffer assembly 20 includes a pair of stuffer forks 30 and 31. A reciprocating plunger 34 or ram packs each successive charge rearwardly in the bale chamber 22.

The baler 10 also includes conventional needle 36 and knotter assemblies that cooperate for threading twine around the crop in the bale chamber 22, knotting the twine, and cutting the ends of the twine to form individually tied bales of crop. The needle assembly 36 receives a continuous length of twine from a source that is supported on the square baler 10.

The bale chamber 22 extends from the rear of the chassis 12 and presents a crop inlet end at the inlet 32 for receiving crop from the stuffer assembly 20 and a bale discharge end 38 for discharging the individually tied bales of crop. Referring to FIG. 5, at its inlet end the bale chamber 22 includes a pair of sidewalls 40 and 42, a top wall 43 (FIG. 1) and a bottom wall 45 (FIGS. 1 and 4) that are all secured to the chassis 12. The walls 40, 42, 43 and 45 define the region of reciprocating travel of the plunger 34. This region is of fixed dimensions and is the area in which each new charge of crop material from the duct 29 is packed and compressed rearwardly against the previously compacted charges that form a partial bale. A rigid box frame 47 is defined at the rear of the compacting region by a pair of horizontally extending upper and lower cross members 44,46 (see FIG. 4) and a pair of vertically extending left and right upright members 48,50 (FIG. 5), all bolted or otherwise rigidly affixed to the rear ends of the walls 40, 42, 43 and 45. The box frame 47 serves as a hinge point for in-and-out movement of adjustable side rails of the baler, as will be seen.

As best illustrated in FIG. 5, the bale chamber 22 includes four elongated stationary corner rails 52,54,56,58 that extend rearwardly from the box frame 47 to the discharge end 38 of the baler. The fixed corner rails 54,54,56,58 support the vertical and horizontal squeeze assemblies 92,94 of the squeeze mechanism 24 as described in more detail below and serve to maintain the square cross section shape of the bales as they are being formed in the bale chamber 22.

The forward ends of the corner rails 52,54,56,58 adjacent the crop inlet 32 are bolted or otherwise attached to upright mounting brackets 60,61 fixed to box frame 47. The rear ends of the corner rails 54,54,56,58 adjacent the discharge end 38 of the bale chamber 22 are bolted or welded to an upright, generally rectangular support frame 62.

As best illustrated in FIG. 6, the stationary support frame 62 includes a pair of horizontally extending and vertically spaced arms 64,66 and a pair of vertically extending and horizontally spaced arms 68,70. The ends of the arms 64,66,68,70 are bolted together to form a closed frame. As best illustrated in FIGS. 5 and 6, the interior corners of the support frame 62 are fixed to L-shaped brackets 71 which are in turn welded or otherwise attached to the ends of the corner rails 52,54,56,58 adjacent their rear ends.

The top wall of the adjustable portion of the bale chamber 22 is preferably formed by a pair of elongated, parallel top rails 72,74 extending from the box frame 47 to a point slightly beyond the support frame 62. Referring to FIG. 4, the front ends of the top rails 72,74 are connected to hinges 76,78 attached to the upper horizontally extending cross member 44. Therefore, the top rails 72,74 are supported for vertical hinged or pivotal movement about the hinges 76,78.

The bottom wall of the adjustable portion of the bale chamber 22 is preferably formed by a pair of elongated, parallel bottom rails 80,82 extending from the box frame 47 to the same rear point as the top rails 72,74. The front ends of the bottom rails 80,82 are connected to hinges 84,86 supported on the lower horizontally extending cross member 46 of box frame 47. Therefore, the bottom rails 80,82 are supported for vertical pivotal movement about the hinges 84,86.

Referring to FIGS. 1 and 3, the right wall of the adjustable portion of the bale chamber 22 is preferably formed by an elongated right siderail 88 that is coextensive with the other rails. The front end of right siderail 88 has a vertical hinge connection to the fixed bracket 60. Thus, the siderail 88 is free to pivot in and out as squeeze mechanism 24 is actuated. A left siderail 90 is similarly constructed and hingedly mounted.

As best illustrated in FIGS. 1-3, the squeeze mechanism 24 is positioned proximate the discharge end 38 of the bale chamber 22 for adjusting the size of the discharge opening formed by the rear ends of the movable top, bottom and siderails. The preferred squeeze mechanism 24 includes a vertical squeeze assembly 92 (FIGS. 4, 7 and 8) for adjusting the vertical distance between the top rails 72,74 and the bottom rails 80,82, and a horizontal squeeze assembly 94 (FIGS. 5, 9, and 10) for adjusting the horizontal distance between the left and right siderails 88,90.

The vertical squeeze assembly 92 includes a jaw-type lever assembly 96 attached to and surrounding the top and bottom rails 72,74,80,82. Assembly 92 also includes a cylinder assembly 98 for shifting the lever assembly 96 and rails 72,74,80,82 between an extended, least restrictive position illustrated in FIG. 8, and a retracted, most restricted position of FIG. 7.

The lever assembly 96 includes a stationary vertical support arm 99 fixed to stationary rails 52,54, and a pair of movable top and bottom lever arms 100,102 pivotally supported to opposite ends of the support arm 99. The support arm 99 is secured to the two corner rails 52,54 by a pair of L-shaped brackets 104,106 (FIG. 4). The support arm 99 preferably curves outwardly at its midsection for accommodating the horizontal inward and outward shifting of the right siderail 88.

The top lever arm 100 is pivotally connected to the upper end of the support arm 99 and extends transversely across the top rails 72,74. The mid-section of the top lever arm 100 is secured to the top rails 72,74 by a bracket 108. Similarly, the bottom lever arm 102 is pivotally connected to the lower end of the support arm 99 and extends transversely across the bottom rails 80,82. The mid-section of the bottom lever arm 102 is secured to the bottom rails 80,82 by a bracket 110.

The cylinder assembly 98 is coupled between the open ends of the top and bottom lever arms 100,102 and is operable for selectively shifting the top and bottom lever arms 100,102 towards and away from one another. In preferred forms, the rod end 112 of the cylinder assembly 98 is coupled with the top lever arm 100 and the anchor end 114 is coupled with the bottom lever arm 102. Thus, extending and retracting the cylinder assembly 98 also adjusts the vertical distance between the top rails 72,74 and bottom rails 80,82 near the discharge end 38 of the bale chamber 22.

Likewise, the horizontal squeeze assembly 94 includes a jaw-type lever assembly 116 surrounding and attached to the left and right siderails 88,90, and a cylinder assembly 118 for shifting the lever assembly 116 and rails 88,90 between an extended, least restricted position as illustrated in FIG. 10, and a retracted, fully restricted position as illustrated in FIG. 9.

The lever assembly 116 includes a stationary, horizontal support arm 119 across the top of the baler and a pair of upright, right and left lever arms 120,122 pivotally connected to opposite ends of the support arm 119. The support arm 119 is secured to two of the corner rails 52,58 by a pair of L-shaped brackets 124,126 (FIG. 5). The support arm 119 curves outwardly at its midsection for accommodating the vertical inward and outward shifting of the top rails 72,74.

As best illustrated in FIGS. 9 and 10, the lever arm 120 is pivotally connected to the right end of the support arm 119 and extends transversely across the rail 88. The mid-section of the lever arm 120 is secured to the rail 88 by a bracket 128. Similarly, the lever arm 122 is pivotally connected to the proximal end of the support arm 119 and extends transversely across the rail 90. The mid-section of the lever arm 122 is secured to the rail 90 by a bracket 130.

The cylinder assembly 118 spans the bottom of the baler and is coupled between the open ends of the arms 120,122. Assembly 118 is operable for selectively shifting the arms 120,122 toward and away from one another. In preferred forms, the rod end 132 of the cylinder assembly 118 is coupled with the lever arm 122 and the anchor end 134 is coupled with the lever arm 120. Since the lever arm 120 is secured to the rail 88, and lever arm 122 is secured to the rail 90, extending and retracting assembly 118 also adjusts the horizontal distance between the rails 88,90 near the discharge end 38 of the bale chamber 22. The cylinder assemblies 98,118 are coupled with conventional hydraulic fluid piping and control mechanisms (not shown) for simultaneously actuating the cylinder assemblies 98,118 and controlling their operation.

In operation, the above-described squeeze mechanism 24 functions to simultaneously adjust all four sides of the variable portion of chamber 122 through the movable top, bottom and siderails. Because the discharge opening formed by the rear end of the movable rails is smaller than the chamber in the fixed size area, the chamber 22 actually tapers down as the discharge is approached. This taper or restriction provides resistance as the mass of material within chamber 22 is pushed rearwardly by the plunger 34 during its compression strokes. The extent of the resistance determines the degree to which each charge is compressed against the front end of the partially formed bale during the first part of the compression stroke before the entire mass of material is then nudged rearwardly during the last part of the compression stroke.

If less compression is desired, the cylinders 98 and 118 are extended somewhat, increasing the size of the discharge outlet symmetrically by adjusting all four sides. If greater compression is desired from the plunger, the cylinders 98 and 118 are retracted an appropriate amount, thus symmetrically necking down the discharge outlet by moving in all four sides. The cylinders 98 and 118 are plumbed in a parallel fluid flow relationship such that they both experience the same hydraulic pressure at all times. An adjustable relief valve (not shown) in the circuit determines the pressure at the cylinders. Fluid in the circuit is continuously pumped over relief throughout the baling operation so that the rails "float" in and out to a certain extent as the baling process is carried out.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. In an extrusion-type square baler having a bale chamber for forming bales therein, the bale chamber presenting an inlet end and a discharge end, the discharge end having a discharge opening, the improvement comprising:

a pair of elongated and vertically spaced top and bottom rails extending between the inlet and discharge ends of the bale chamber;

a pair of elongated and horizontally spaced left and right siderails extending between the inlet and discharge ends of the bale chamber; and a squeeze mechanism positioned proximate the discharge end of the bale chamber for adjusting the size of the discharge opening of the bale chamber, the squeeze mechanism including a vertical squeeze assembly including a first fluid power assembly for selectively shifting the top and bottom rails towards and away from one another for adjusting the vertical distance between the top and bottom rails near the discharge opening of the bale chamber, and a horizontal squeeze assembly including a second fluid power assembly for selectively shifting the left and right siderails towards and away from one another for adjusting the horizontal distance between the left and right siderails near the discharge opening of the bale chamber, said first and second power assemblies being at least essentially simultaneously actuatable to simultaneously adjust all four sides of the bale chambers.

2. In an extrusion-type square baler as claimed in claim 1, the vertical squeeze assembly further including a jaw-type lever assembly including a vertically extending support arm secured to one side of the bale chamber, a top lever arm extending transversely across the top rail and pivotally connected to the upper end of the support arm, and a bottom lever arm extending transversely across the bottom rail and pivotally connected to the lower end of the support arm, wherein the first power assembly is coupled between the top and bottom lever arms for selectively shifting the top and bottom lever arms towards and away from one another for adjusting the vertical distance between the top and bottom rails near the discharge opening of the bale chamber.

3. In an extrusion-type square baler as claimed in claim 1, the horizontal squeeze assembly further including a jaw-type lever assembly including a horizontally extending support arm secured to the top wall of the bale chamber, a left lever arm extending transversely across the left siderail and pivotally connected at its upper end to the left end of the support arm, and a right lever arm extending transversely across the right siderail and pivotally connected at its upper end to the right end of the support arm, wherein the second power assembly is coupled between the left and right lever arms for selectively shifting the left and right lever arms towards and away from one another for adjusting the horizontal distance between the left and right siderails near the discharge opening of the bale chamber.

4. In an extrusion-type square baler as claimed in claim 1, further including a plurality of elongated, L-shaped, stationary corner rails extending between the inlet and discharge ends of the bale chamber, the corner rails forming the corners of the bale chamber, the vertical and horizontal squeeze assembly support arms being fixedly attached to at least one of the corner rails.

5. In an extrusion-type square baler having a bale chamber for forming bales therein, the bale chamber presenting an inlet end and a discharge end having a discharge opening, the improvement comprising:

a pair of elongated and vertically spaced top and bottom rails extending between the inlet and discharge ends of the bale chamber;

a pair of elongated and horizontally spaced left and right siderails extending between the inlet and discharge ends of the bale chamber; and a squeeze mechanism positioned proximate the discharge end of the bale chamber for adjusting the size of the discharge opening of the bale chamber, the squeeze mechanism including a vertical squeeze assembly including a first lever assembly including a top lever arm coupled with the top rail, a bottom lever arm coupled with the bottom rail, and a first power assembly for selectively shifting the top and bottom lever arms towards and away from one another for adjusting the vertical distance between the top and bottom rails near the discharge opening of the bale chamber, and a horizontal squeeze assembly including a second lever assembly including a left lever arm coupled with the left siderail, a right lever arm coupled with the right siderail, and a second power assembly for selectively shifting the left and right lever arms towards and away from one another for adjusting the horizontal distance between the left and right siderails near the discharge opening of the bale chamber.

said first and second power assemblies being at least essentially simultaneously adjustable to simultaneously adjust all four sides of the bale chamber.

6. In an extrusion-type square baler as claimed in claim 5, further including a plurality of elongated, L-shaped, stationary corner rails extending between the inlet and discharge ends of the bale chamber, the corner rails forming the corners of the bale chamber, the vertical and horizontal squeeze assembly support arms being fixedly attached to at least one of the corner rails.

* * * * *